(12) United States Patent
Boudreaux et al.

(10) Patent No.: US 7,197,806 B2
(45) Date of Patent: Apr. 3, 2007

(54) FASTENER FOR VARIABLE MOUNTING

(75) Inventors: Brent Boudreaux, Highland Village, TX (US); Eric Peterson, McKinney, TX (US); Brandon Rubenstein, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/041,550

(22) Filed: Jan. 24, 2005

(65) Prior Publication Data

US 2005/0191149 A1   Sep. 1, 2005

Related U.S. Application Data

(62) Division of application No. 10/365,243, filed on Feb. 12, 2003.

(51) Int. Cl.
   *B23P 11/00*   (2006.01)
   *F16D 1/00*   (2006.01)

(52) U.S. Cl. .................. 29/434; 29/525.01; 29/525.11; 403/408.1; 403/409.1; 403/374.1; 403/374.3; 403/374.4

(58) Field of Classification Search ................ 29/434, 29/469, 525.01, 525.02, 525.11, 243.5; 403/373, 403/374.1, 374.2, 374.3, 374.4, 370, 297, 403/408.1, 409.1, 290; 280/504; 208/604, 208/504

See application file for complete search history.

(56) References Cited

U.S. PATENT DOCUMENTS

| | | | |
|---|---|---|---|
| 3,274,744 A | 9/1966 | Louis et al. | |
| 3,945,743 A | 3/1976 | Koch | |
| 3,971,186 A | 7/1976 | Haveika et al. | |
| 4,318,157 A | 3/1982 | Rank et al. | |
| 4,775,260 A | 10/1988 | Kecmer | |
| 4,819,713 A | 4/1989 | Weisman | |
| 4,824,303 A | 4/1989 | Dinger | |
| 5,201,242 A | 4/1993 | Chi | |
| 5,290,122 A | 3/1994 | Hulme | |
| 5,464,299 A | 11/1995 | Scharer et al. | |
| 5,680,798 A | 10/1997 | Luen | |
| 5,779,388 A | 7/1998 | Yamamoto | |
| 6,203,239 B1 | 3/2001 | Mucciaccciaro et al. | |
| 6,435,064 B1 * | 8/2002 | Persechino | 81/442 |
| 6,835,021 B1 * | 12/2004 | McMillan | 403/374.4 |
| 6,874,971 B2 * | 4/2005 | Albaugh | 403/297 |
| 2004/0096271 A1 * | 5/2004 | Peter et al. | 403/374.3 |
| 2004/0156676 A1 * | 8/2004 | Boudreaux et al. | 403/408.1 |
| 2005/0117966 A1 * | 6/2005 | Steinbeck | 403/408.1 |

FOREIGN PATENT DOCUMENTS

DE    4132260 A1    4/1993
EP    0329074 A2    2/1989

\* cited by examiner

*Primary Examiner*—Essama Omgba

(57) ABSTRACT

A fastener assembly comprising a first wedge portion having an angled end, a second wedge portion having an angled end, and a fastener extending through the first wedge portion and the second wedge portion, wherein a portion of the fastener protrudes from one of the first and second wedge portions for interfacing with a component to be mounted, wherein the angled end of the first wedge portion and the angled end of the second wedge portion are interfaced when the fastener is extended through the first wedge portion and the second wedge portion.

8 Claims, 6 Drawing Sheets

FASTENER FOR VARIABLE MOUNTING

CROSS-REFERENCE TO RELATED APPLICATION

The present application is a divisional of co-pending and commonly assigned U.S. patent application Ser. No. 10/365,243 entitled "Fastener for Variable Mounting," filed Feb. 12, 2003, the disclosure of which is incorporated herein by reference.

FIELD OF THE INVENTION

The present invention relates in general to mounting fasteners, and in particular to a wedge-lock fastener for variable mounting.

DESCRIPTION OF RELATED ART

In the past, when a system component was to be mounted securely to another component, such as a host circuit board, a system housing, or device cage, with a variable mount, such as to allow adjustment along an axis before securing the device, a slotted fastener receiver, such as a slotted bracket, was used. This was done to allow the mounting fastener to slide in the slot as the position of the component was adjusted prior to locking the part in the desired position. Such a slot is elongated in the direction of the relative motion between the components (the adjustment axis), and the mounting fastener is tightened from a direction perpendicular to the axis of adjustment. Accordingly, this slotted bracket design requires access from a side of the component, perpendicular to the direction of adjustment in order to engage the mounting fastener. When such a side of the component cannot be accessed, such as due to the constraints of parts adjacent to the component being mounted, the component cannot be locked down in a variable location without great difficulty, such as disassembly of other system components. However, such adjustable mounts are often necessary to accommodate system component mechanical tolerances, such as tolerance stack-up in the assembly caused by the upper and lower limit parts coming together.

As a specific example of implementation of the prior art design, a system processor, having a large heat sink thereon, may be provided which interfaces with a cell board via a connector assembly. The tolerances of the pieces of the connector assembly, the processor packaging, the heat sink, and/or supporting framework of the cell board or system housing may result in appreciable variation in the position of the heat sink relative to a mounting point, such as a mounting point on supporting framework of the cell board or system housing. The processor and heat sink assembly may be relatively heavy, and may be provided in a configuration in which the heat sink is cantilevered with respect to the connector assembly, thereby necessitating firmly attaching the heat sink to supporting framework to allow for the cell board shock loads without dislodging the connector assembly parts. Accordingly, a variable mount according to the prior art, wherein a slot is disposed at the mounting point parallel to the axis of adjustment (here parallel to the direction of insertion of the processor into the connector assembly), may be provided to accommodate the aforementioned tolerances. Access to a fastener to firmly hold the processor onto the cell board in this prior art design would be perpendicular to the adjustment axis (perpendicular to the slot) and on a side of the processor heat sink orthogonal to the direction of insertion of the processor in the connector assembly. However, it may not always be possible to access this side of the processor heat sink to tighten a fastener, such as a screw, extending through the slot into the processor heat sink for tightening.

Another prior art solution is shown in U.S. Pat. No. 4,819,713 issued to Weisman, the disclosure of which is hereby incorporated herein by reference. The mounting system of Weisman provides a retainer for retaining an electronic circuit board in the slots of a cold plate, incorporating a square wedge-type design to press the circuit board between two edges of a slot. Accordingly, the retainer is limited to uses in which it is disposed parallel to a surface of the circuit board, which may be problematic, such as in situations where an adjustment axis is desired which is perpendicular to the circuit board surface. Furthermore, the mounting system would need a stationary opposable surface, such as a wall or "C" channel, to act against in the prior art. Moreover, access to the mounting components in at least two directions is utilized, one for inserting the circuit board and one for engagement of the mount, which may be problematic in particular situations where access is limited.

In another prior art solution, a standoff may be used, such as protruding from the cell board where processor is placed. An end of the processor heat sink may be placed on the standoff and a fastener, such as a screw, passed through the heat sink into the standoff. Although this configuration provides for tightening the fastener from a same direction as the insertion of the processor in the connector assembly (a direction from which there will presumably be access to facilitate insertion of the processor in the connector assembly), the standoff does not allow for adjustment of the attachment point without removal and replacement of the standoff. Accordingly, the processor assembly may be not be held orthogonal with respect to the connector assembly, i.e., the processor assembly may be tilted applying bending forces upon the connector assembly and/or one edge of the connector assembly remaining only partially engaged, because of the inability to adjust the mount to accommodate variances due to tolerances etcetera.

BRIEF SUMMARY OF THE INVENTION

Embodiments of the present invention provide a fastener assembly comprising a first wedge portion having an angled end, a second wedge portion having an angled end, and a fastener extending through the first wedge portion and the second wedge portion, wherein a portion of the fastener protrudes from one of the first and second wedge portions for interfacing with a component to be mounted, wherein the angled end of the first wedge portion and the angled end of the second wedge portion are interfaced when the fastener is extended through the first wedge portion and the second wedge portion.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1A:
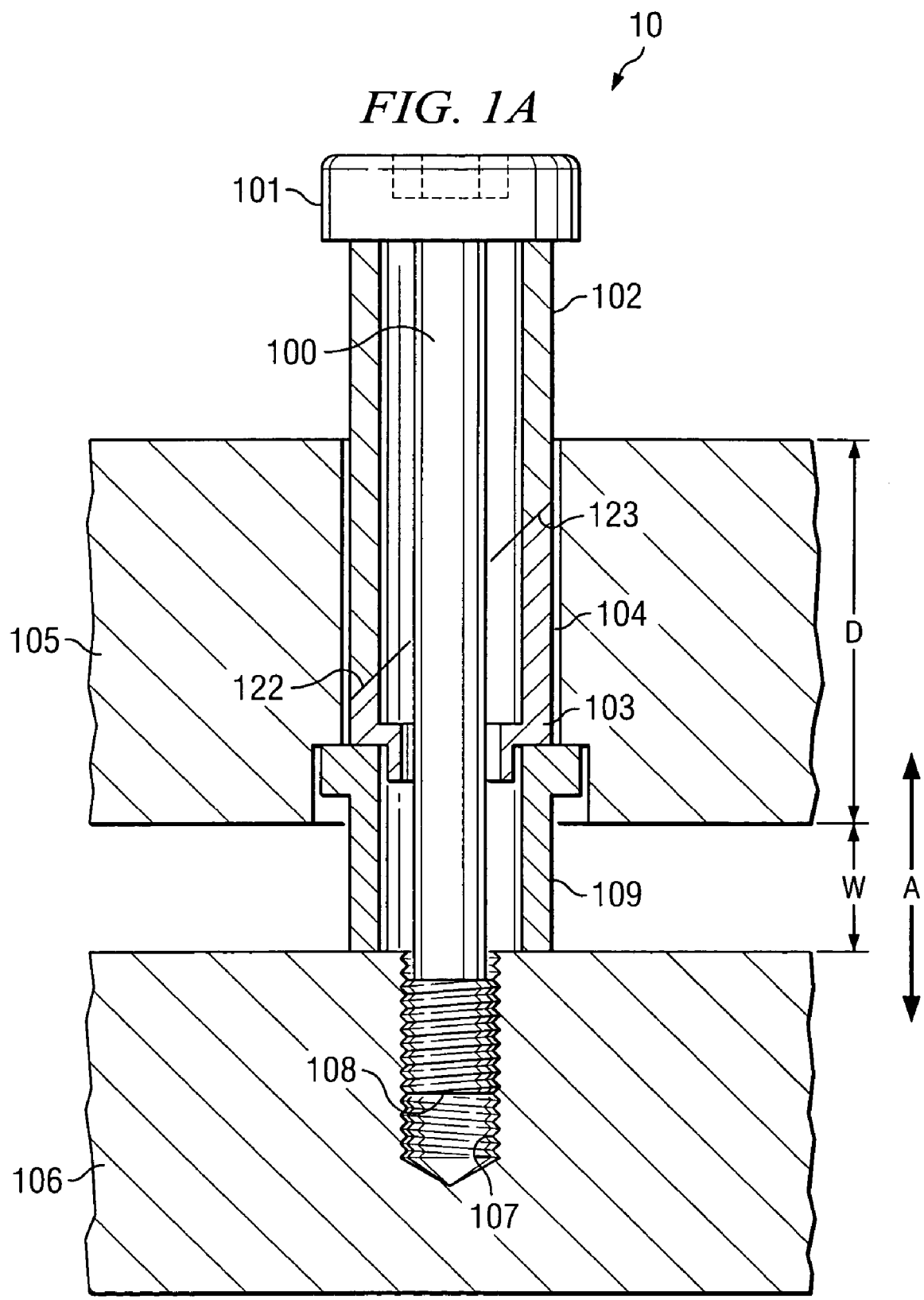
FIGS. 1A and 1B depict a sectional view of a fastener assembly according to an embodiment of the present invention.

The present invention is directed to systems and methods providing a fastener assembly for adjustably fastening components, wherein the fastener is engaged by access to the fastener from a direction parallel to an adjustment axis. For example, torque to engage a fastener assembly of an embodiment of the present invention, to lock down a system component in a variable location, may be provided when access to the fastener assembly is only available in the direction of adjustment or movement of the component.

Embodiments of the present invention utilize wedge portions, as may be drawn together by an adjustment means such as a screw, bolt, rack, etcetera, to exert a retaining force orthogonal to an adjustment axis and the axis associated with fastener assembly engagement access. For example, embodiments of the invention may comprise two wedge portions, having ends cut at an angle, e.g., each at a 45° angle, thereby providing a wedge shaped profile, and a screw passed therethrough. Application of torque to the screw in such an embodiment may operate to draw the two wedge portions together, resulting in the wedge-shaped ends sliding against one another and, thus, causing sides of the two cylinders to move laterally in opposite directions. Accordingly, by inserting the fastener assembly into a receiver in a component to be fixedly mounted via a receiver at a mounting point of a supporting structure, wherein the receivers may comprise, for example, an opening of a size to accept at least a portion of the wedge portions therethrough, the component may be adjusted longitudinally along the wedge portions until a desired position relative to the supporting structure is achieved. Thereafter, the fastener wedge portions may be drawn together, causing sides of the wedge portions of the fastener assembly to move in opposite directions laterally, thereby providing binding forces against the aforementioned receivers.

It should be appreciated that release of a fastener assembly of embodiments of the present invention may be achieved by removing the force drawing the aforementioned wedge portions together, such as by applying torque to a screw passed therethrough in a direction opposite that used to draw the wedge portions together. Embodiments of the invention may provide a bias force, such as using a spring disposed longitudinally within the wedge portions, to encourage the wedge portions to be repelled from one another and allowing sides thereof to retract from a binding position.

Additionally, embodiments of the present invention allow for adjustment along at least 2 axes, thereby providing a plurality of degrees of freedom with respect to a mounting point. For example, the aforementioned receivers may comprise a slot elongated in the direction of a second adjustment axis to provide for additional freedom of movement with respect to the position of a component relative to a supporting structure.

Embodiments of this invention may include captivating wedge portions of the fastener assembly to provide an assembly with no loose or free parts. For example, the wedge portions of the fastener assembly may be fitted on a threaded fastener, such as a screw, and captivation may be achieved through a threaded portion of the fastener passing through a threaded orifice in a lower wedge portion. Additionally or alternatively, captivation of pieces of a fastener assembly of embodiments of the present invention may utilize press-in pins on the sides of the fastener, a threaded collar on the fastener, a snap ring on the fastener, or the like.

Figure 1B:
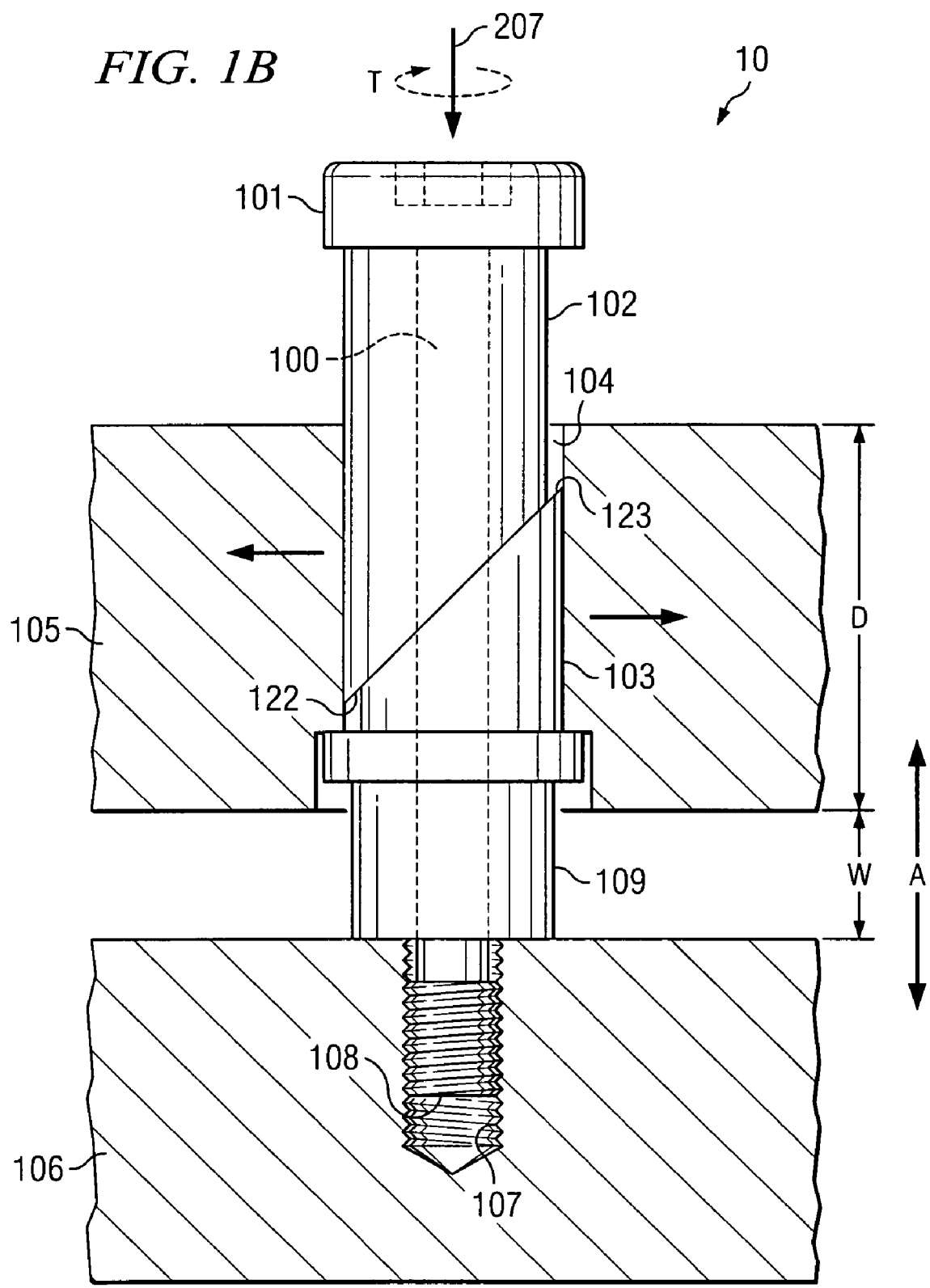
Figure 2:
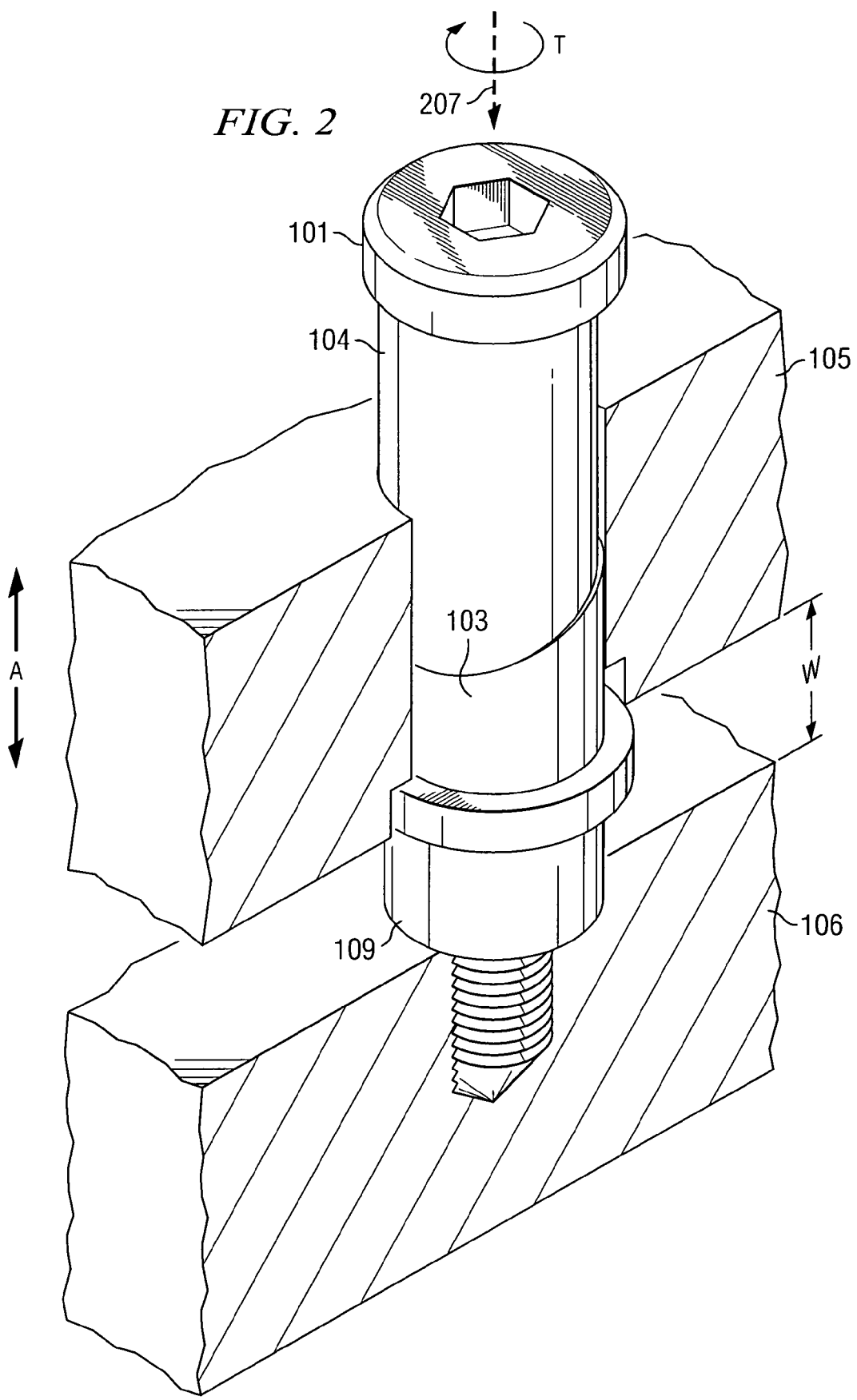
FIG. 2 depicts an isometric view of the fastener assembly of FIGS. 1A and 1B.

Directing attention to FIGS. 1A and 1B, an embodiment of fastener assembly 10 according to an embodiment of the present invention is shown in a sectional view. FIG. 2 provides a corresponding solid view of fastener assembly 10 of FIGS. 1A and 1B. In the embodiment of FIGS. 1A, 1B, and 2, fastener assembly 10 serves to fixedly mount components 105 and 106 to one another. Components 105 and 106 may comprise any number of components to be affixed together. For example, according to one embodiment of the present invention, component 105 comprises a processor assembly and component 106 comprises a host cell board. Of course, other components may be fixedly mounted according to the concepts of the present invention.

Fastener assembly 10 of the illustrated embodiment includes wedge portions 102 and 103, here cylindrical bodies, having opposing ends 122 and 123 thereof cut at an angle, e.g., each at a 45° angle, thereby providing a wedge shaped profile. Fastener 100, having head portion 101 and threaded portion 108, is passed through a center shaft of wedge portions 102 and 103. Fastener assembly 10 of the illustrated embodiment further includes threaded collar 109 disposed near an end of fastener 100 opposite head portion 101, such that wedge portions 102 and 103 are disposed between head portion 101 and threaded collar 109. Components 105 and 106 are preferably adapted to facilitate engagement of fastener assembly 10 of the illustrated embodiment and accommodate adjustment of the relative positions of components 105 and 106. For example, component 105 of the illustrated embodiment includes receiver 104, here a through hole, through which at least a portion of fastener assembly 10 extends and, when not engaged, is free to slide along adjustment axis A. Component 106 of the illustrated embodiment includes receiver 107, here a threaded hole, into which at least a portion of fastener assembly 10 extends.

The illustrated embodiment provides means for retaining fastener assembly 10 with component 105, even prior to interfacing fastener assembly 10 with component 106 and prior to engaging fastener assembly 10. Specifically, threaded collar 109 of fastener assembly 10 allows threaded portion 108 of fastener 100 to be threaded therethrough such that a non-threaded shaft portion of fastener 100 is disposed through threaded collar 109. Thereafter, threaded portion 108 prevents fastener 100 from being extracted from threaded collar 109. It should be appreciated that threaded collar 109 of the illustrated embodiment is sufficiently sized to prevent passage through the length of receiver 104. Accordingly, when fastener assembly 10 of the illustrated embodiment is assembled after portions thereof are disposed in receiver 104, fastener assembly 10 is retained with component 105 by head portion 101 and threaded collar 109 preventing extraction from receiver 104.

The embodiment illustrated in FIGS. 1A, 1B, and 2 includes a portion of receiver 104 having a somewhat wider cutout, e.g., counter bore, at a lower portion of component 105, corresponding to threaded collar 109. Such a counter bore facilitates the use of the aforementioned threaded collar while minimizing or eliminating the effect upon the size of gap W which may be achieved using fastener assembly 10. Specifically, the counter bore of the illustrated embodiment allows component 105 to be adjusted to an extent that threaded collar 109 is recessed therein. Of course, gap W of the illustrated embodiment may be selected such that component 105 is disposed sufficiently off of component 106 that threaded collar 109 is not within the counter bore, if desired.

It should be appreciated that fastener assembly 10 allows for adjustment of the relative position of component 105 with respect to component 106 along adjustment axis A. Accordingly, gap W may be adjusted as desired prior to engaging fastener assembly 10, such as to allow component 105 to maintain a proper orientation and/or relative position with respect to other system aspects (not shown).

According to the illustrated embodiment, threaded portion 108 of fastener 100 interfaces with receiver 107 to hold fastener assembly 10 thereto. Although component 105 is free to be adjusted along axis A, thereby adjusting gap W, prior to fastener assembly 10 being engaged, head portion 101 of fastener assembly 10 prevents component 105 from being removed from fastener assembly 10.

In operation according to the illustrated embodiment, torque (shown as T in FIG. 2) applied by access to fastener 100 along the direction of arrow 207, corresponding to adjustment axis A, causes threaded portion 108 to interface further with receiver 107. Threaded collar 109 abuts component 106, thereby preventing all but fastener 100 of fastener assembly 10 from proceeding further in the direction of arrow 207. As fastener 100 is drawn further in the direction of arrow 207, head portion 101 is drawn toward threaded collar 109, thereby drawing wedge portions 102 and 103 together. As the space between head portion 101 and threaded collar 109 becomes less than the combined lengths of wedge portions 102 and 103, the angles of opposing ends 122 and 123 cause lateral movement of sides of wedge portions 102 and 103 in opposite directions as shown in FIG. 1B. Accordingly, as fastener 100 is tightened, upper and lower wedge portions 102 and 103 slip relative to one another along edges 122 and 123 and expand against the walls of receiver 104, locking component 105 in place at a selected position along fastener assembly 10.

It should be appreciated that, according to the illustrated embodiment, receiver 104 is sized to both adjustably accept at least a portion of fastener assembly 10 and to fixedly engage fastener assembly 10. Accordingly, a diameter of receiver 104 of embodiments of the present invention is selected to be slightly larger than a diameter of wedge portions 102 and 103 of fastener assembly 10. Moreover, a depth (shown as D in FIGS. 1A and 1B) of receiver 104 of embodiments of the present invention is selected to be thick enough to accommodate a desired range of adjustment, wherein at any position throughout the adjustment range a side of both upper and lower wedge portions 102 and 103 is in contact with receiver 104 to thereby grip the inside of the receiver.

Figure 3A:
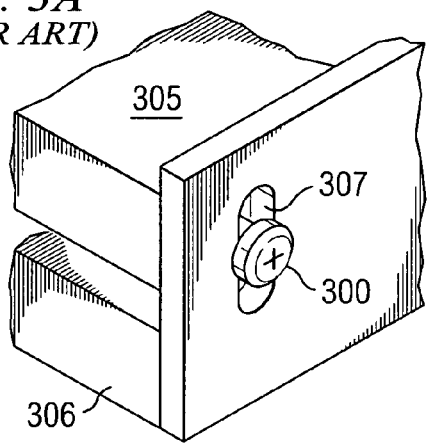
FIGS. 3A and 3B depict a prior art slotted bracket mounting device.
Figure 3B:
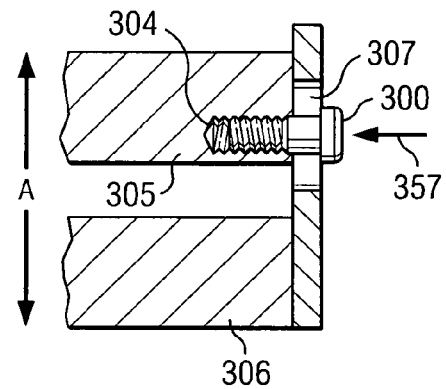

In contrast to the operation of the embodiment of the present invention illustrated in FIGS. 1A, 1B, and 2, FIGS. 3A and 3B show an example of adjustable mounting according to the prior art, wherein FIG. 3A shows an isometric view and FIG. 3B shows a sectional view thereof. In FIGS. 3A and 3B, fastener 300 serves to fixedly mount components 305 and 306 to one another. To provide for adjustment of the relative positions of components 305 and 306, component 306 includes receiver 307 slotted in the direction of adjustment axis A. Receiver 304 of component 305 is threaded to interface with fastener 300. When component 305 has been positioned as desired with respect to component 306, torque is applied to fastener 300 from the direction of arrow 357 to thereby cause fastener 300 to further interface with receiver 304 and fixedly engage receiver 307. It should be appreciated that, although providing adjustment along axis A, fastener 100 requires access along an axis orthogonal to axis A. In contrast, fastener assembly 10 of the embodiment described above provides adjustment along axis A using access along this same axis.

Figure 4:
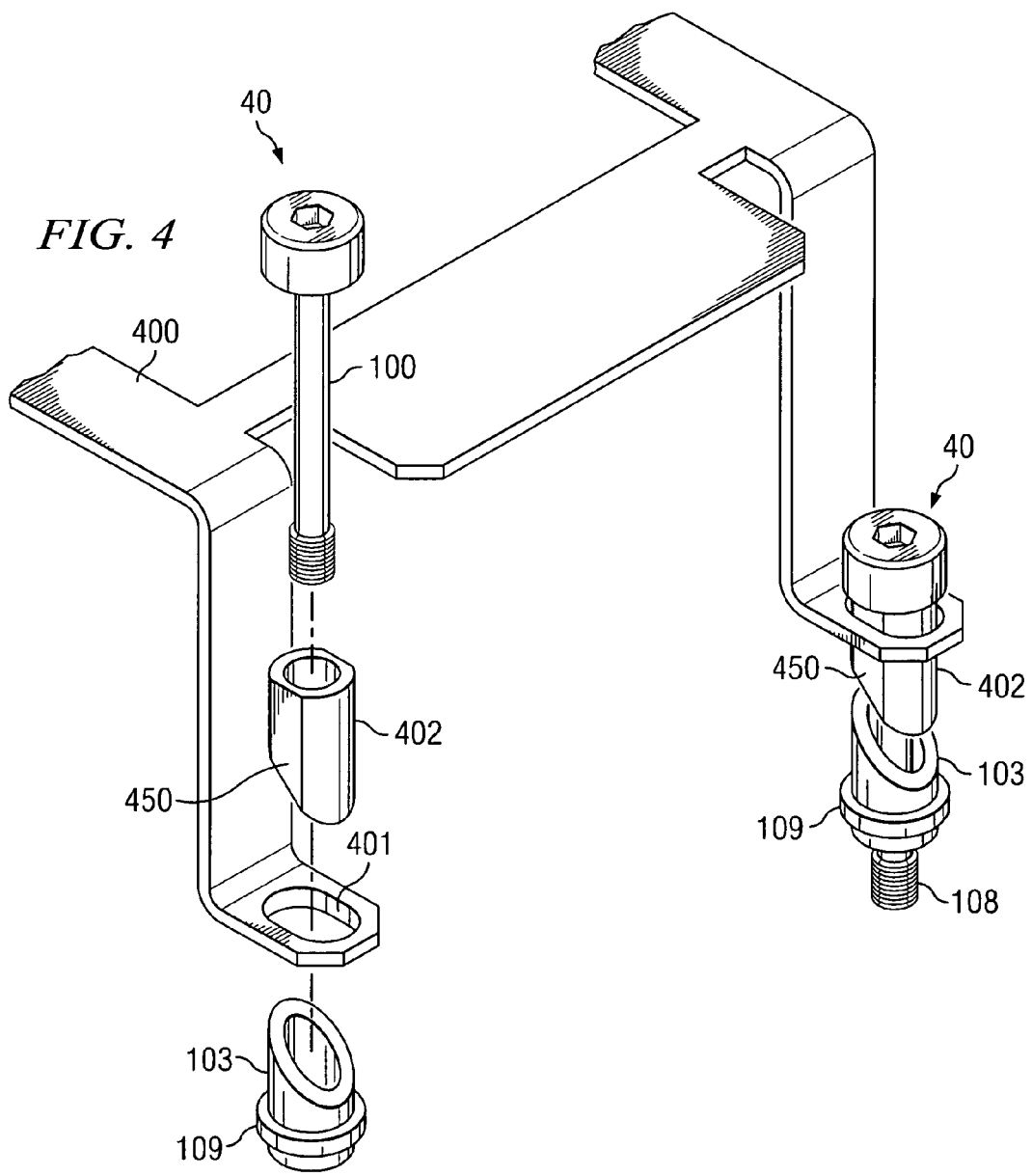
FIG. 4 depicts a fastener assembly according to an alternative embodiment of the present invention.

Having described concepts of the present invention with reference to an embodiment as illustrated in FIGS. 1A, 1B, and 2, various enhancements and/or alterations will be described. Directing attention to FIG. 4, an embodiment of fastener assemblies 40 of the present invention are shown adapted for use with frame 400. In the embodiment of FIG. 4, fastener assemblies 40 are retained in corresponding ones of receivers 401 of frame 400, to thereby provide a frame and fastener assembly for allowing adjustable fixed attachment of one or more system components, such as components 105 and 106 discussed above. However, fastener assemblies 40 of FIG. 4 provide flat surfaces 450 on upper wedge portions 402. Preferably, flat surfaces 450 are provided upon opposing sides of wedge portions 402. Flat surfaces 450 of the illustrated embodiment cooperate with corresponding flat surfaces of receiver 401 to control the orientation of the angles of opposing ends of wedge portions 402 and 103, and thus the direction that these wedges apply pressure.

Figure 5:
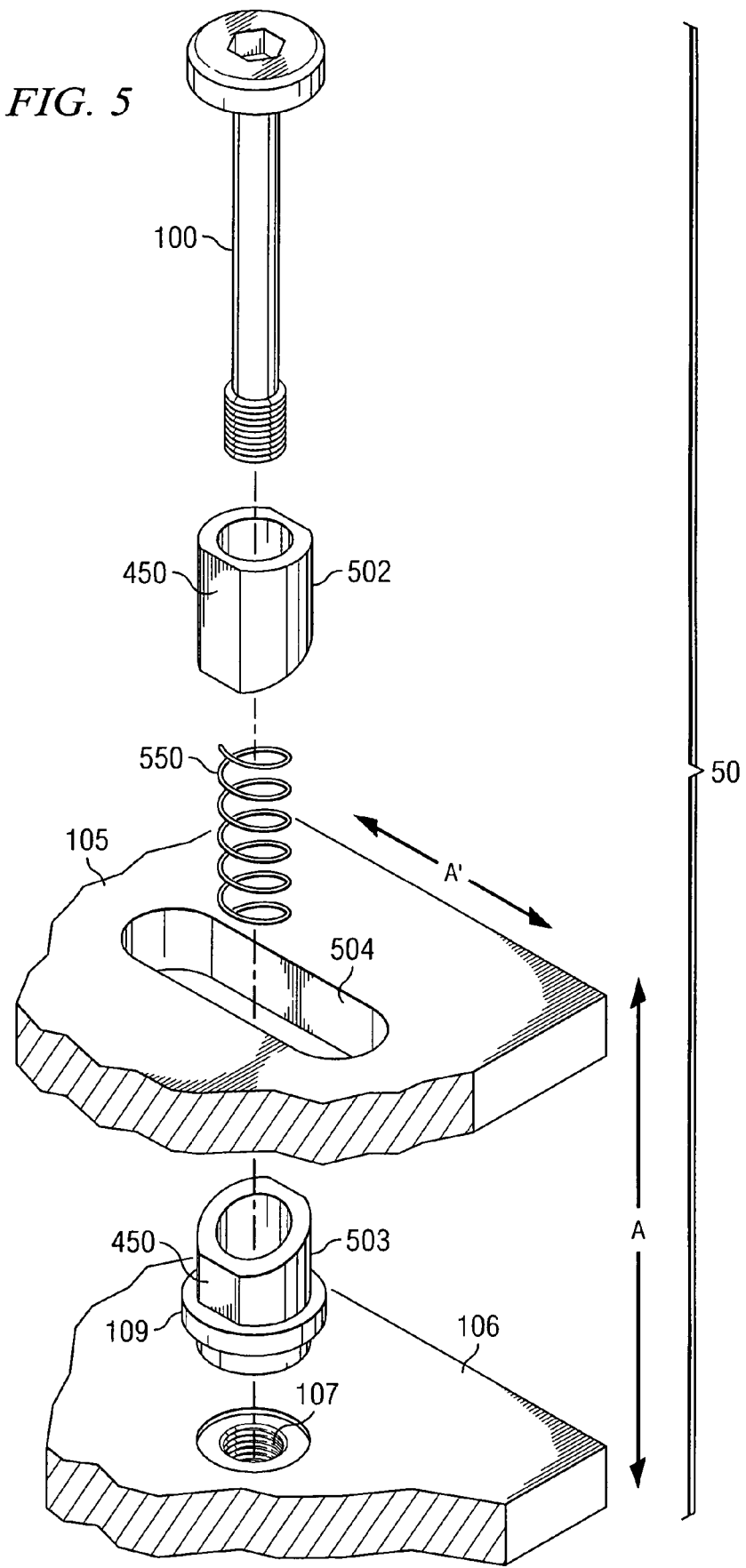
FIG. 5 depicts a fastener assembly according to an embodiment of the present invention providing a plurality of degrees of freedom with respect to adjustment of components.

FIG. 5 shows a further embodiment in which the aforementioned flat surfaces 450 are provided not only upon upper wedge portion 502, but also upon lower wedge portion 503. However, in the embodiment of FIG. 5, flat surfaces 450 are rotated 90° with respect to the angles of the opposing edges of wedge portions 502 and 503, as compared to the embodiment of FIG. 4. Accordingly, binding forces resulting from operation of fastener assembly 50 of FIG. 5 will be provided in directions associated with a vector protruding orthogonally from the faces of flat surfaces 450.

Also in the embodiment of FIG. 5, receiver 504 of component 105 is slotted. Fastener assembly 50 is passed through slotted receiver 504 and into receiver 107 with flat surfaces 450 preferably corresponding to the long edges of slotted receiver 504. In this embodiment, not only is adjustment provided along axis A, but a second degree of freedom is provided along axis A' corresponding to the longitudinal direction of slotted receiver 504. As torque is applied to fastener 100 of the illustrated embodiment, flat surfaces 450 of wedge portions 502 and 503 are encouraged to bind against the long edges of slotted receiver 504, wherein the eccentric shape of the wedge portions prevents their rotating within slotted receiver 504, to thereby provide fixed attachment as discussed above with respect to FIGS. 1A, 1B, and 2.

Spring 550, such as may be disposed along the shaft of fastener 100 within wedge portions 502 and 503, is shown in FIG. 5. This spring may provide a bias force, such as against a necked down portion at the distal ends of the through hole of wedge portions 502 and 503, to encourage wedge portions to be repelled from one another and allowing sides thereof to retract from a binding position. Although shown only in the embodiment of FIG. 5, it should be appreciated that such a spring or other bias means may be utilized with respect to various embodiments of the present invention.

The embodiments of FIGS. 6–9 illustrate various implementations of techniques for retaining the portions of fastener assemblies of the present invention as a single unit. For example, the embodiments of FIGS. 6–9 depict four potential embodiments for captivation of the fastener 100 prior to use.

Figure 6:
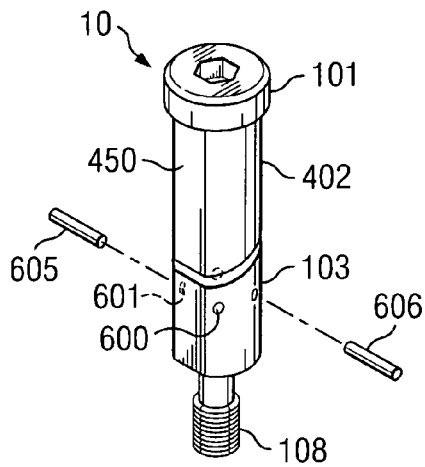
FIGS. 6–8 depict alternative embodiments of fastener assemblies of the present invention implementing various captivation techniques.

FIG. 6 depicts an embodiment for captivation of the assembly through use of press-in pins 605 and 606. Captivation in this embodiment is achieved by having through holes 600 and 601 through the lower wedge portion 103 where pins 605 and 606 may be pressed in on each side of fastener 100 to prevent a larger portion thereof, here threaded portion 108, from passing between pins 605 and 606.

Figure 7:
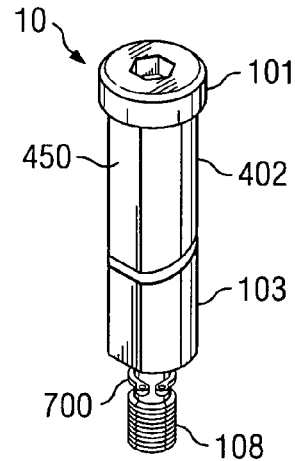

FIG. 7 depicts an embodiment for captivation of the assembly through use of snap ring 700 on fastener 100. Upper wedge portion 402, lower wedge portion 103 and fastener 100 are preferably captivated by placement of snap ring 700 over a relieved section of fastener 100.

Figure 8:
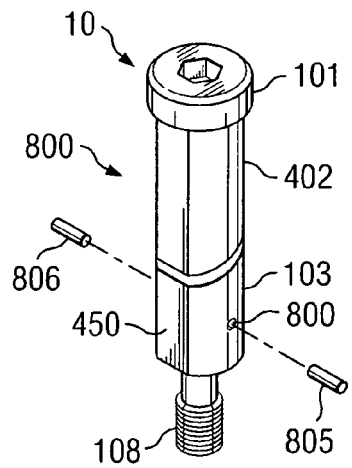

FIG. 8 depicts an embodiment for captivation of the assembly through use of press-in pins 805 and 806. The embodiment of FIG. 8 is similar that of FIG. 6 in its use of press-in pins 805 and 806 in corresponding through holes (only through hole 800 is visible in the Figure) on either side of the fastener assembly 10. However, in the embodiment of FIG. 8, pins 805 and 806 are pressed-in on opposing sides of fastener 100 such that a gap remains between opposing ends of pins 805 and 806 within wedge portion 103 which is sufficiently small to prevent threaded portion 108 from passing through.

Figure 9:
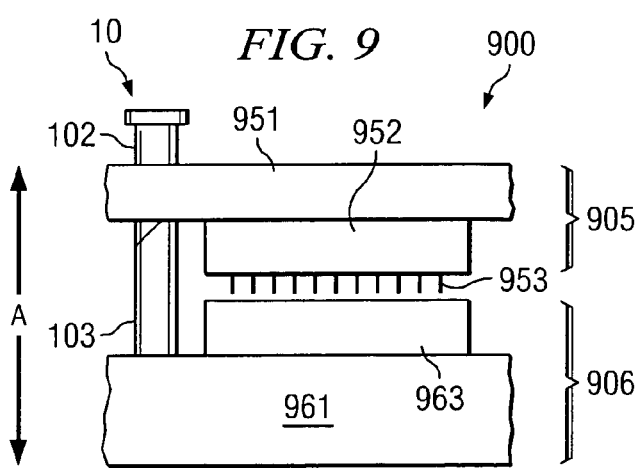
FIG. 9 depicts a deployment of a fastener assembly according to an embodiment of the present invention.

Having described various embodiments of fastener assemblies of the present invention, a specific example of a use thereof will be described with reference to FIG. 9. FIG. 9 shows components 905 and 906 of system 900. For example, component 905 may comprise heat sink 951, processor 952, and connector 953 of a processor module. Component 906 may comprise electronic circuit board 961, such as a cell board, having connector 963 to receive connector 953 and thus interface with the processor module. Heat sink 951 may be relatively large and/or heavy, thus suggesting it should be fixedly attached to circuit board 961 to accommodate expected shock forces. However, the position of heat sink 951 relative to circuit board 961 may not be exactly predictable due to tolerances associated with connector 963, connector 953, and processor 952. Accordingly, a degree of adjustment with respect to fixedly attaching heat sink 951 to circuit board 961 along axis A may be desired to avoid a situation in which heat sink 951 is mounted in a tilted relationship to circuit board 961, and thus connectors 953 and 963 are not squarely interfaced.

By disposing fastener assembly 10 through a receiver of heat sink 951, such as described above with respect to receiver 106 of component 105, and into a receiver of circuit board 961, such as described above with respect to receiver 107 of component 106, connectors 953 and 963 may be fully and squarely engaged and heat sink 951 allowed to slide along axis A to any position of fastener assembly 10. Thereafter, fastener assembly 10 may be engaged to cause wedge portions 102 and 103 to slip in relation to one another and overlap in heat sink 951. Accordingly, wedge portions 102 and 103 bind against the receiver of heat sink 951 and hold the relative positions of components 905 and 906. It should be appreciated that the interface between wedge portions 102 and 103 is shown in FIG. 9 disposed below heat sink 951. However, prior to engaging heat sink 951 as described above, heat sink 951 will be moved relative to fastener assembly 10 such that at least a portion of the interface between wedge portions 102 and 103 will be disposed therein, thereby facilitating the aforementioned binding by wedge portions 102 and 103 against heat sink 951.

Figure 10:
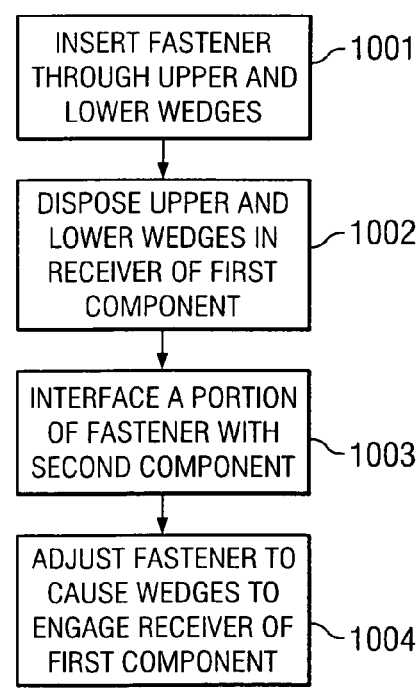
FIG. 10 depicts a flow diagram according to an embodiment of the present invention.

The flow diagram of FIG. 10 shows steps performed in implementing an adjustable mount as shown in FIG. 10. At step 1001, a fastener (e.g., fastener 100) of a fastener assembly (e.g., fastener assembly 10) is inserted through first and second wedges of said fastener assembly (e.g., wedge portions 102 and 103). At step 1002 the first and second fastener assembly wedges are disposed in a receiver of a first component (e.g., component 905). At step 1003 a portion of the fastener is interfaced with a receiver of a second component (e.g., component 906). At step 1004 the fastener is adjusted such that the first and second wedges slip relative to one another and engage walls of the receiver of the first part, thereby locking the position of the first component relative to the second component.

Although embodiments have been described herein with reference to wedge portions of a fastener assembly, it should be appreciated that the concepts of the present invention are not limited to use with cylindrical configurations. Accordingly, embodiments of the present invention may implement any number of geometries, provided such geometries are sized and/or shaped to provide binding forces to a corresponding receiver as described herein. For example, embodiments of the present invention may implement rectangular, ovular, and hexagonal portions for providing adjustable mounts as described herein.

To aid the reader in understanding the concepts of the present invention various relative terms, such as upper and lower, top and bottom, etcetera, have been used. However, it should be appreciated that the concepts of the present invention are not limited to application in any particular orientation. Accordingly, such relative terms are not intended to limit the present invention to any particular orientation.

What is claimed is:

1. A method for providing adjustable mounting with respect to first and second components, said method comprising:
    inserting a fastener of a fastener assembly through first and second wedges of a fastener assembly;
    disposing said first and second fastener assembly wedges in a receiver of said first component;
    interfacing a portion of said fastener with a receiver of said second component, wherein said receiver of said first component and said receiver of said second component are slotted to provide freedom of movement with respect to the position of said first component relative to said second component; and
    adjusting said fastener such that said first and second wedges slip relative to one another and engage walls of said receiver of said first component, thereby locking the position of the first component relative to said second component.

2. The method of claim 1, further comprising:
    adjusting a position of said first component relative to said second component prior to adjusting said fastener.

3. The method of claim 2, wherein an axis of said adjusting said position is parallel to a direction of access for said adjusting said fastener.

4. The method of claim 2, wherein said adjusting said position comprises at least two degrees of freedom with respect to adjustable movement of said first component relative to said second component.

5. The method of claim 1, wherein said fastener comprises a screw and said interfacing a portion of said fastener comprises threading said portion of said screw into said receiver of said second component.

6. The method of claim 1, further comprising:
    capturing said first and second wedges on said fastener.

7. The method of claim 1, further comprising:
    maintaining a desired orientation of said first and second wedges with respect to said first component during said adjusting said fastener.

8. The method of claim 7, wherein said maintaining a desired orientation comprises:
    interfacing a flat surface of at least one of said first and second wedges with a corresponding receiver flat surface.

* * * * *